United States Patent [19]

Magarian et al.

[11] Patent Number: 4,511,423
[45] Date of Patent: Apr. 16, 1985

[54] APPARATUS FOR WINDING FIBER REINFORCED PIPE FITTINGS

[75] Inventors: Gerald M. Magarian, Cypress; Ralph S. Friedrich, Hermosa Beach, both of Calif.

[73] Assignee: Ameron, Inc., Monterey Park, Calif.

[21] Appl. No.: 560,107

[22] Filed: Dec. 12, 1983

Related U.S. Application Data

[62] Division of Ser. No. 300,292, Sep. 8, 1981, Pat. No. 4,437,816.

[51] Int. Cl.³ .................................................. B65H 81/00
[52] U.S. Cl. ............................................ 156/425; 156/175
[58] Field of Search ............... 156/425, 175, 169, 446, 156/361; 242/7.21, 7.22, 7.23, 7.02

[56] References Cited

U.S. PATENT DOCUMENTS

| | | | |
|---|---|---|---|
| 2,878,038 | 3/1959 | Noland | 285/55 |
| 3,112,234 | 11/1963 | Krupp | 156/175 |
| 3,140,058 | 7/1964 | Courtney | 156/175 |
| 3,146,962 | 9/1964 | Hardwick | 242/7.21 |
| 3,308,001 | 3/1967 | Angrave | 156/425 |
| 3,476,327 | 11/1969 | Vawter | 242/7.21 |
| 3,765,979 | 10/1973 | Thomas | 156/173 |
| 3,810,805 | 5/1974 | Goldsworth et al. | 156/361 |
| 3,963,185 | 6/1976 | Quirk | 242/7.21 |
| 4,249,704 | 2/1981 | Sakaue et al. | 156/425 |
| 4,323,408 | 4/1982 | Dana et al. | 156/425 |
| 4,384,913 | 5/1983 | Dana et al. | 156/425 |

OTHER PUBLICATIONS

Herstellung von Formstucken fur GFK-Rohre nach dem Wickelverfahren, G. Menges and E. A. Hille, 7 pages.
Herstellung von Formstucken fur GFK-Fernwarmerchre nach dem Wickelverfahren, Fabrication of District Heating GRP Pipes by the Filament Winding Method, G. Menges and E. A. Hille, pp. 730-735.
Entwicklungen im Bereich der Wickeltechnik; Anon; 18 pages.
Institut fur Kunststoffverarbeitung, GRP-Pipe Fittings Produced on a Computer Controlled Filament Winding Machine, E. A. Hille, G. Menges, 14 pages.

*Primary Examiner*—Michael Ball
*Attorney, Agent, or Firm*—Christie, Parker & Hale

[57] ABSTRACT

A fiber reinforced plastic pipe tee is wound around a mandrel according to this method and apparatus. Fiber rovings are delivered to the mandrel by way of a delivery ring translated in an X-Y plane. The mandrel can be rotated around an A axis parallel to the X direction or a B axis parallel to the Y direction. By switching between either rotation around the A axis or around the B axis, a three axis numerical control system can be employed. Means are provided for alternately rotating the mandrel around the A and B axes. Means are provided for independently translating the delivery ring in the X and Y directions as the mandrel rotates. The delivery ring comprises a curved bar around which a band of resin impregnated rovings makes a turn enroute to the mandrel for maintaining a reasonably constant width of the band of rovings.

33 Claims, 11 Drawing Figures

APPARATUS FOR WINDING FIBER REINFORCED PIPE FITTINGS

CROSS REFERENCE TO RELATED APPLICATIONS

This is a division of application Ser. No. 300,292 filed Sept. 8, 1981, now U.S. Pat. No. 4,437,816.

FIELD OF THE INVENTION

This invention relates to fiber reinforced plastic pipe fittings, for example, a glass fiber reinforced epoxy resin pipe tee. Methods and apparatus are provided for winding such pipe fittings.

BACKGROUND

Fiber reinforced plastic pipe has come into reasonably extensive use in recent years for handling corrosive materials, petrochemicals and the like where metallic pipe is unsuitable. Glass fiber reinforcements are employed so that pipe can withstand appreciable pressures. Epoxy resins are often used and a thin lining layer of epoxy or other material is commonly used for enhancing resistance to chemicals. The pipes are formed by winding rovings of glass fiber coated with epoxy resin in helical paths around a cylindrical mandrel and curing the resin. Such pipes can be made economically and it is desirable to make economical fittings for such pipes, such as tees, crosses, laterals or Y's, elbows and reducers.

Techniques have been developed for economically winding pipe elbows which are essentially sharply curved sections of pipe having two ends. Economical techniques have not been developed for winding pipe tees, crosses, and laterals since they have much more complicated geometry. Unlike an elbow having two ends, a pipe tee has three ends. This greatly complicates the winding problems since it is important to cover all areas of the tee with a sufficient thickness of fibers with proper orientation for resisting the complex stress distributions in a tee without excess thickness being built up in other areas.

A variety of machines have been proposed for winding fiber reinforced plastic pipe tees and the like. These machines have been limited in the patterns of windings that can be made because of limitations on the motions available by the pipe fitting or roving delivery system. Such machines are slow and require a substantial time to wind a pipe fitting, thereby significantly increasing cost, both because of poor utilization of the machine and the increased labor required for attending the machine. Such machines have been devoted to a single purpose such as winding a tee rather than being universally useful for a variety of pipe fittings.

A variety of winding patterns have been developed which collectively can cover a pipe tee with fibers in suitable orientations. A variety of patterns for winding such a pipe tee are described in U.S. patent application Ser. No. 186,338 filed Sept. 11, 1980, by Ralph S. Friedrich and Kenneth Charles Naylor and in U.S. patent application Ser. No. 186,335 filed Sept. 11, 1980, by Ralph S. Friedrich and Ronald G. Ulrich. Both of these applications are assigned to the same assignee as this application. The subject matter of these applications is hereby incorporated by reference.

Such patterns can be wound by hand but the resultant pipe tee would be expensive. It is therefore desirable to provide apparatus for winding a fiber reinforced pipe tee or other pipe fitting rapidly and reproducibly. Since a variety of winding patterns are needed, it is preferably that such a machine be controlled electronically, that is with the so-called "numerical control" systems now available. Readily available electronic systems will synchronously control three axes, that is, three directions of motion, either angular or linear, at the same time. Although four axis controllers are also commercially available, the increased complexity and smaller production of such numerical control systems makes them appreciably more costly. Many so-called four axis numerical control systems actually control only three axes simultaneously and the fourth axis is time shared electrically with one of the others. For winding a pipe tee, such systems can require complicated hardware. It is therefore desirable to provide a machine for winding pipe fittings where three axes of numerical control are sufficient. Developing a program or sequence of control functions for a four axis numerical control system is notably more complex than developing a program for three axes. There is no advantage to a more costly and complex control system when a three axis system can be used to produce the same results.

BRIEF SUMMARY OF THE INVENTION

Thus, there is provided in practice of this invention according to presently preferred embodiments a method and apparatus for winding a fiber reinforced pipe fitting around a mandrel with a fiber roving being delivered to the mandrel by way of a delivery ring. The delivery ring is translated in an X-Y plane for delivering roving to the mandrel from selected directions. The mandrel can be rotated around an A axis parallel to the X direction or a B axis parallel to the Y direction. A mandrel for a pipe tee, for example, has the axis of the run coincident with the A axis and the axis of the branch can lie on the B axis. By switching between either rotation around the A axis or around the B axis, a three axis numerical control system can be employed.

DRAWINGS

These and other features and advantages of the present invention will be appreciated as the same becomes better understood by reference to the following detailed description when considered in connection with the accompanying drawings wherein.

DESCRIPTION

A fiber reinforced plastic pipe fitting is made by wrapping a resin coated roving of fibers around a mandrel. An expeditious technique is to connect an end of the roving to the mandrel and then rotate the mandrel. The rotation provides a force for drawing roving from a spool of roving. Various tensioning devices and guides can be provided between the spool and mandrel and the roving can be passed through a bath of liquid resin before wrapping on the mandrel. After a desired pattern of windings is made on the mandrel the resin is cured and the mandrel removed.

A significant feature of an apparatus for winding a fiber reinforced pipe fitting is the choice of axes of motion to be controlled. There are at least seven potentially useful controls to consider. A mandrel for a pipe fitting can be rotated about three orthogonal axes. A delivery eye or ring for delivering fiber roving to the pipe fitting can be translated in three orthogonal directions. This combination of six degrees of freedom can provide all of the patterns needed for winding a fiber reinforced pipe fitting. To enhance the speed of completing a pipe fitting it is desirable to wind several rovings in parallel somewhat analogous to winding a tape or ribbon on the mandrel. When this is done care must be taken to avoid twisting the band of rovings to avoid crossing the fibers. It can therefore be necessary to rotate the delivery ring and the entire creel from which rovings are dispensed in synchronism with the pipe fitting to avoid such twisting. This can amount to a seventh degree of freedom.

The selection of the axes of motion and control for winding a fiber reinforced pipe fitting can have a very significant impact on speed of winding, ability to avoid certain winding problems, and the ability to develop certain desirable patterns of windings on the mandrel. It is quite desirable to avoid rotating the entire creel of spools of roving since this can provide a very significant limitation on the attainable speed and passing the rovings through liquid resin for coating the fibers can be very difficult.

It has been found that an extremely efficient technique for winding a pipe fitting can be provided by translating a ring for delivering roving in an X-Y plane and rotating the pipe fitting mandrel alternately around either of two axes parallel to the X-Y plane. It has been found that with only these degrees of freedom, sufficient patterns for winding fiber reinforced pipe fittings can be generated without need to rotate the mandrel about both axes simultaneously. The third axis of mandrel rotation and third direction of delivery ring translation can be eliminated. It is not necessary to rotate the delivery ring or creel.

Figure 5:
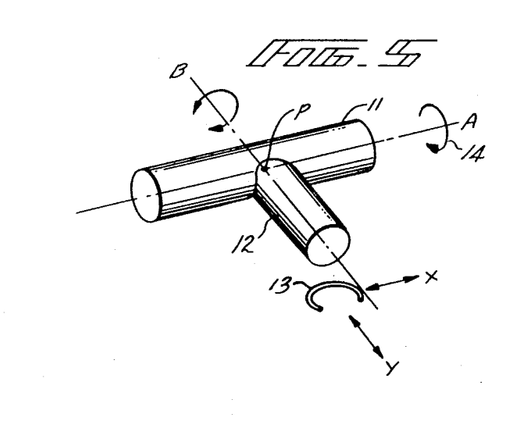
FIG. 5 is a schematic illustration showing the axes of motion used by the apparatus.

The degrees of freedom used in practice of this invention are indicated schematically in FIG. 5, using a pipe tee as an exemplary fitting. Such a pipe tee has a straight run 11 through which fluid can flow in a straight path. The cross member 12 of the tee transverse to the run is known as the branch. Fluid can flow in a right angle path between the run 11 and the branch 12. In other embodiments of pipe fittings not illustrated herein there are members corresponding to the run and branch. Thus in a lateral or Y there is a straight run and a branch extending diagonally at 45°. In a pipe cross there is a straight run and a pair of branches on opposite sides of the run.

Fiber roving is delivered to the pipe tee mandrel through a delivery ring 13. The delivery ring can be translated in an X-Y plane which is conveniently a horizontal plane in the most practical apparatus. The schematic pipe tee in FIG. 5 is illustrated in what is referred to herein as a home position with the plane of the axes of the run and branch being horizontal or parallel to the X-Y plane. In the home position the branch extends from the run in the direction of the delivery ring.

The mandrel can be rotated around an A axis coincident with the axis of the run 11 and parallel to the X direction. Alternatively, the mandrel can be rotated around a B axis coincident with the axis of the branch 12 and parallel to the Y direction. The A and B axes intersect at a point P which remains fixed.

Preferably the point P is offset from the X-Y plane in which the delivery ring moves a distance about the same as the radius of the pipe fitting being made. Thus, the X-Y plane is approximately tangent to the lower edge of the run 11. Rotation of the mandrel around the A axis is in a direction such that the portion of the mandrel tangent to the X-Y plane moves away from the delivery ring 13 as indicated by the arrow 14 in FIG. 5. The roving is wrapped around the mandrel on the side withdrawing away from the delivery ring, hence remains substantially in the X-Y plane as it moves from the delivery ring toward the run on the mandrel. The rovings can swing below the X-Y plane as some windings are made on the branch. Rovings can also rise a short distance above the X-Y plane when wound beyond the ends of the run and onto a post or drum at the end of a representative embodiment of mandrel described in the aforementioned patent applications.

Any desired helical path of roving can be applied to the run 11 by rotation of the mandrel around the A axis and translation of the delivery ring in the X direction. A circumferential winding is made when the mandrel is rotated around the A axis and the delivery ring remains fixed. A longitudinal component along the run is added when the delivery ring moves in the X direction as the mandrel rotates. The pitch of the helical path is determined by the speed of translation in the X direction relative to the speed of rotation.

Similarly, any helical winding can be made around the branch 12 by rotating the mandrel around the B axis and translating the delivery ring in the Y direction. Longitudinal windings on the branch are made by rotating the mandrel around the A axis.

A desired pattern of windings for making a pipe tee can, therefore, be provided by a combination of A-X and B-Y motions. It is preferable, however, for more rapid completion of a tee to move the delivery ring in both the X and Y directions synchronously while rotating the mandrel around either the A axis or the B axis. These can be referred to as A-X-Y and B-X-Y motions. Since it is found that simultaneous rotation about both the A and B axes is not necessary for producing a desirable combination of windings, a three axis synchronous numerical control system can be used. One axis controls translation of the delivery ring in the X direction. A second axis controls translation of the delivery ring in the Y direction. Means are provided for mechanically switching between A axis rotation and B axis rotation of the mandrel. The third axis of the numerical control system, therefore, can be used alternately for both the A axis and B axis rotations. In effect, a three axis numerical control system is converted to four axis control by mechanically time-sharing the axis that controls A or B axis rotation, rather than electrically time-sharing. As explained hereinafter, this also enables simple latching of the axis that is temporarily not being used.

Preferably, the delivery ring has substantially no translation in a Z direction normal to the X-Y plane. Provision of such motion in the Z direction adds complexity and cost to an apparatus and, probably of more significance, can result in a substantial decrease in speed. The portion of the apparatus for moving the delivery ring in the Y direction is carried on the means for moving the delivery ring in the X direction. Thus, much of the mass of the Y translation system must be translated in the X direction. Such additional mass limits the available acceleration for changing from one speed of translation in the X direction to another speed of translation in the X direction. Addition of a Z axis control carried by the Y axis system would add considerable mass, further slowing the X and Y translation systems. It is fairly easy to provide two independent directions of translation in a lightweight mechanism. Addition of the third direction of translation vastly complicates the mechanism and makes it very much heavier.

This is of considerable significance when winding a tee or other pipe fitting since each wrap around the mandrel can involve several "moves". In an exemplary numerical control system, the distance to be travelled along each axis and the maximum velocity to be reached are predetermined. Each move commences with the controlled element (e.g., delivery ring or mandrel) motionless. Each move ends with the controlled element motionless. Hence, each move requires an acceleration stage and a deceleration stage.

Thus, for example, to translate in the X direction, a "move" involves three stages. Initially, the delivery ring is stationary and the command from the control program is to move at a certain maximum velocity from the original position to a new position. First, the delivery ring accelerates to the command velocity. Secondly, the delivery ring travels at the command velocity for a selected time interval. Thirdly, the delivery ring decelerates to come to rest at the new position. The time required to complete such a move is affected by the rate of acceleration to and from the command velocity. This rate is inversely proportional to mass, hence it is important to have a translation mechanism with low mass.

A pipe fitting such as a tee has a complex geometry and for some windings several moves can be required between the beginning and ending of just one winding around the mandrel. Many hundreds of moves can be needed to complete a tee. The time lost in accelerations can therefore become a very significant factor in the total time required to complete a pipe fitting.

Since the third degree of freedom for the delivery ring or the mandrel necessarily adds substantial mass to the portions of the apparatus that must be accelerated, the limitation of each movable portion to two degrees of freedom assures maximum speed in winding a tee. The delivery ring has two degrees of freedom, in the X and Y directions, respectively, and the mandrel has two degrees of freedom, around the A and B axes, respectively. It has been found that with suitable control of the delivery ring in the X-Y plane, the mandrel need be rotated only about one of the A or B axes at any moment to obtain the patterns needed to completely form a pipe tee. It is not necessary to independently control A and B axis rotations. By switching from one axis to the other a single control can be used for both axes of rotation without loss of speed. Rotation can be switched between the A and B axes in about 100 milliseconds. Rapid switching between A axis and B axis rotation is significant since important wrapping patterns in regions near the intersection of the branch and run require switching the axis of rotation while the rovings are between the ends of a wrapping pattern. Many alternations between A-X-Y and B-X-Y moves can be needed to properly place rovings on all surfaces of a tee.

It is found that with these axes of control, a fitting can be wound without twisting the band of rovings, hence, it is not necessary to rotate a creel for dispensing the rovings.

Twisting of the band of rovings is avoided by moving the delivery ring in the X-Y plane to a location where the intersection of the roving and the mandrel is on the branch. The tee is then rotated around the B axis as a winding is made around the branch. By this maneuver the tee can be rotated so that the ends of the run can switch between ends of the home position. The mandrel can then be rotated around the A axis as the delivery ring is moved in the X-Y plane for reversing the pitch angle of a helical path along the run, for example.

Figure 1:
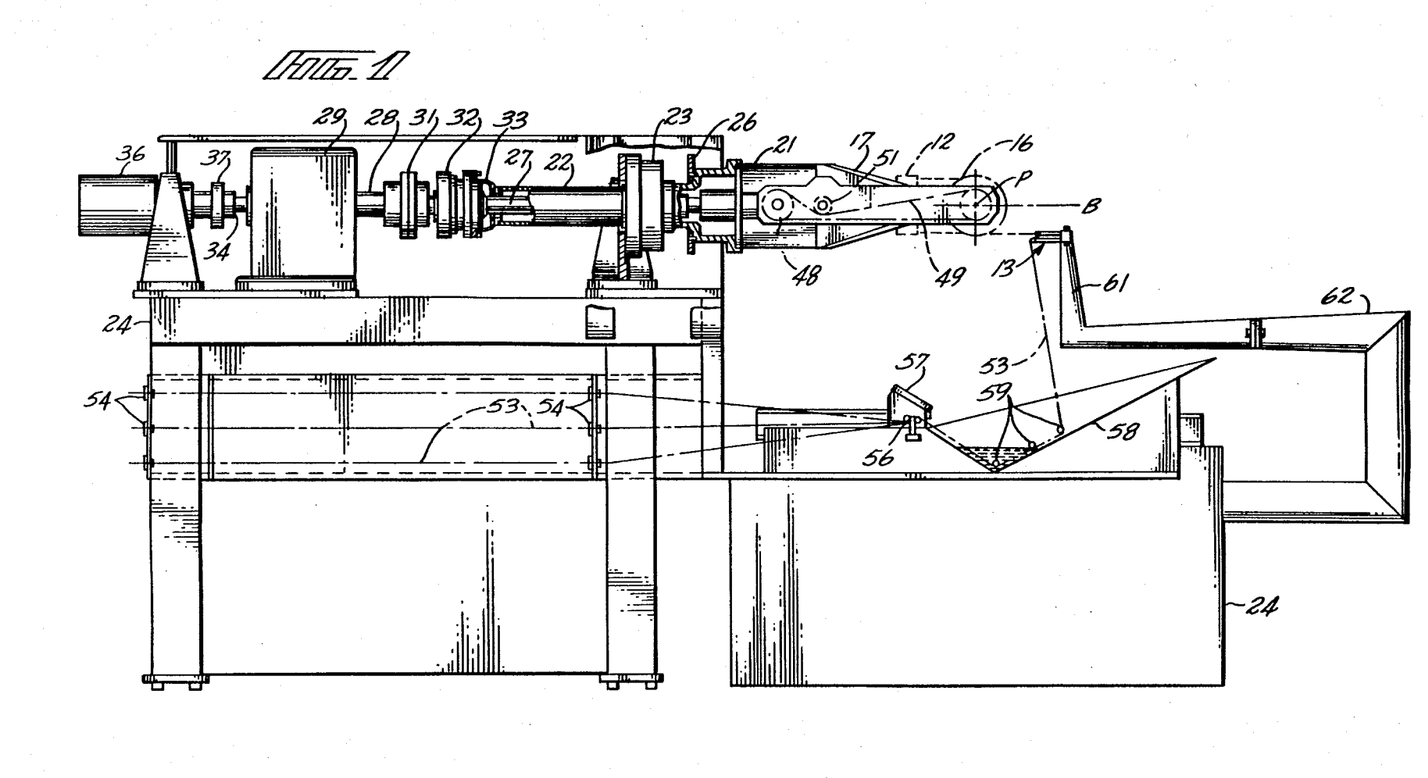
FIG. 1 is a side view, partly cutaway, of an apparatus for winding a fiber reinforced pipe fitting such as a pipe tee.
Figure 2:
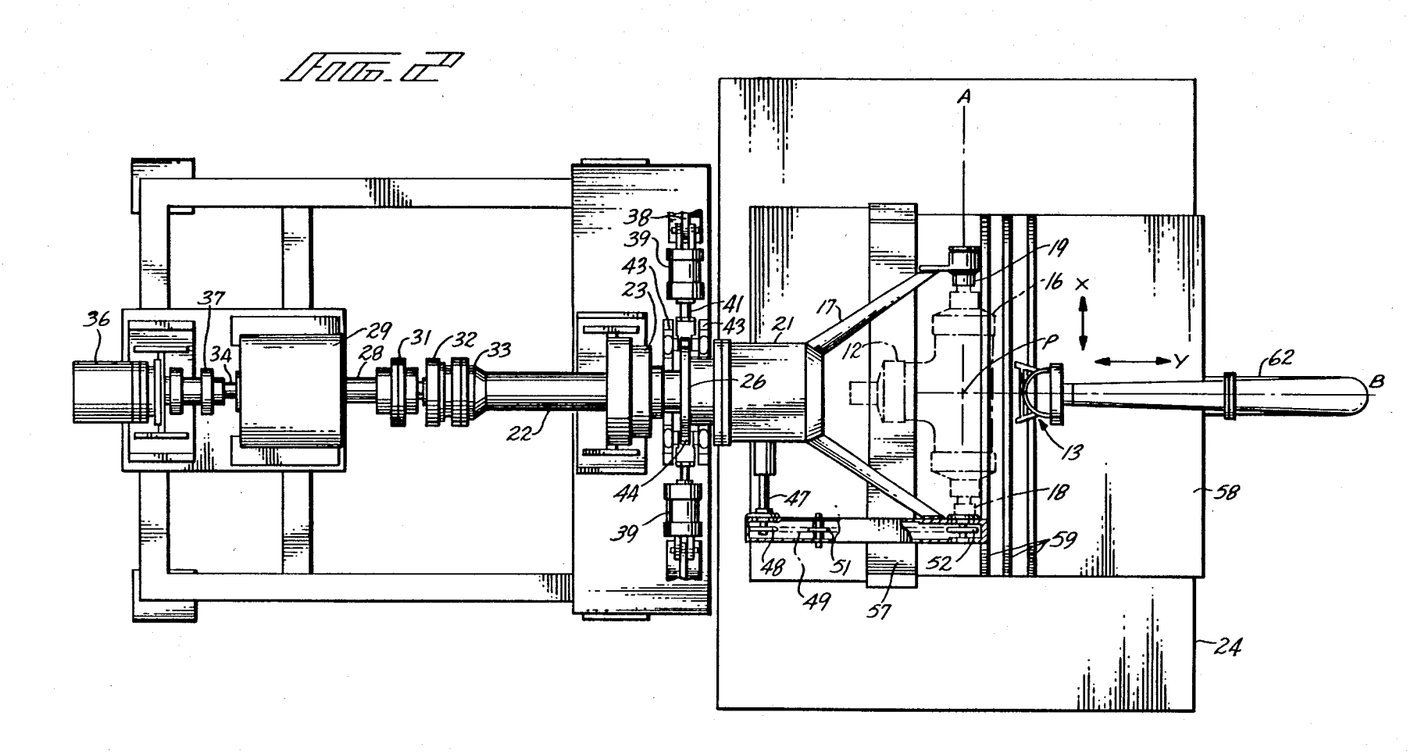
FIG. 2 is a top view, partly cutaway, of the apparatus as used for winding a pipe fitting.

An apparatus for winding a pipe fitting in the manner outlined hereinabove is illustrated in side and top views (partially cut away) in FIGS. 1 and 2, respectively. Components of the apparatus are further illustrated in FIGS. 3, 4, and 6 to 8. In this apparatus, the X-Y plane in which the delivery ring 13 moves is preferably horizontal so that rovings can be conveniently carried through a pool of liquid resin. The X direction in FIG. 1 is perpendicular to the plane of the paper and the Y direction is horizontal. The X-Y plane is parallel to the plane of the paper in FIG. 2. The A axis is normal to the plane of the paper in FIG. 1 passing through the point P. The B axis also passes through point P and extends horizontally as illustrated in FIGS. 1 and 2, as well as horizontally in the exemplary embodiment. The A axis extends vertically through point P in the drawing of FIG. 2. In both of these figures, a mandrel 16 for a pipe tee is illustrated in phantom with the mandrel rotated around the A axis so that the branch 12 is 180° from the home position illustrated in FIG. 5.

The tee mandrel 16 is mounted in a generally Y-shaped (or U-shaped) yoke 17 which provides clearance for the branch upon rotation of the mandrel around the A axis. The mandrel is held between the arms of the yoke by a drive chuck 18 engaging one end of the run and an idler chuck 19 engaging the other end of the run. The idler chuck can be translated along the axis of the run for inserting or withdrawing a mandrel. Such an apparatus can be used for winding pipe tees in pipe sizes from two inch to twelve inch. Replaceable chucks are, therefore, employed for engaging different sizes of mandrels. The mandrel illustrated in phantom is for a twelve inch pipe tee. A larger yoke can be substituted for winding larger fittings.

The two arms of the yoke 17 are rigidly connected to an angle gear box 21 which can also include a gear train for increasing speed of rotation between its input and output shafts. The gear box 21 is rigidly connected to a tube 22 extending along the B axis. The tube is supported by a ball bearing mounting 23 secured to the main frame 24 of the apparatus. A circular flange 26 is also secured to the tube and gear box.

Coaxial within the tube 22 is the input shaft 27 to the gear box 21. This input shaft 27 is connected to the output shaft 28 of a gear reducer 29 by a rigid coupling 31. The input shaft 34 of the gear reducer 29 is connected to a drive motor 36 by a flexible coupling 37 for A and B axis rotation.

A heavy duty tooth-type clutch 32 is connected to the input shaft 27 and to the surrounding tube 22 by way of a bell 33. When the clutch 32 is disengaged the shaft can rotate independently of the tube. When the clutch is engaged the shaft and tube are rigidly connected so as to rotate together. Rotation of the input shaft 27 causes the tube to rotate, causing the entire gear box to rotate. Since the input shaft 27 and gear box 21 are rotating together there is no resultant rotation of the gear box output shaft. The yoke 17 and hence the mandrel 16 rotate with the gear box around the B axis.

A pair of locking mechanisms are provided for selectively preventing or permitting rotation of the tube, gear box, yoke and mandrel around the B axis. Such locking mechanisms appear in the top view of FIG. 2 and one appears in a detailed side view in FIG. 6. Each locking mechanism comprises a pedestal 38 bolted to the main frame 24 of the apparatus. A pneumatic actuator 39 has one end pivotally mounted at the top of the pedestal. The output shaft 41 of the pneumatic actuator is pivotally connected to an arm 42, the lower end of which is pivotally connected to the main frame 24 by pillow blocks 43. The upper end of the pivotable arm 42 is forked and straddles the circular flange 26 on the tube 22.

Figure 6:
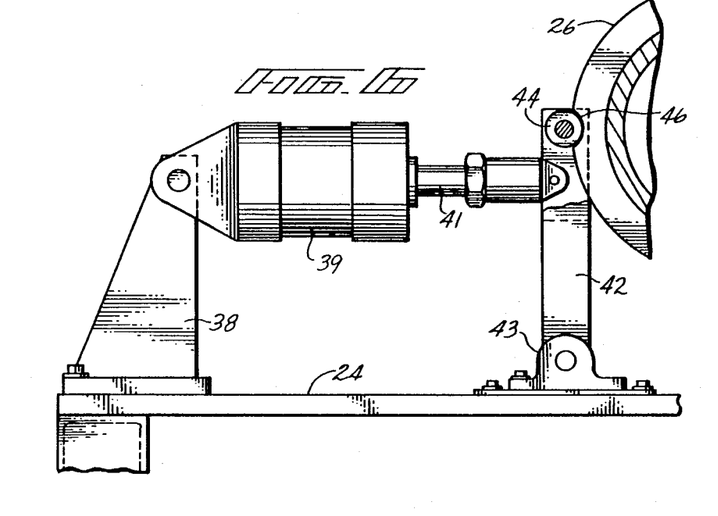
FIG. 6 is a fragmentary view of a latching mechanism for locking one axis of rotation.

A roller 44 in the fork can enter a generally semi-circular notch 46 in the periphery of the flange 26. The two diametrically opposite notches 46 in the flange are aligned with the arms of the yoke 17 so that when the mandrel is in the home position (i.e., with the run horizontal), the notches are in the horizontal plane containing the B axis. Actuation of the pneumatic actuator 39 pivots the arm 42 toward the flange so that the roller 44 engages the notch 46. This engagement locks the flange and hence the yoke against rotation around the B axis. Alternatively, when it is desired to rotate the yoke and mandrel around the B axis, the pneumatic actuator withdraws the roller from the notch and permits such rotation.

The radius of curvature of the notch 46 is larger than the radius of the roller 44. In an exemplary embodiment the roller has a diameter of 1.5 inch and the notch has an effective diameter of 1.562 inch. Thus, the radius of the notch is about 1/32 inch larger than the radius of the roller. This difference in radius between the notch and roller "softens" the impact of stopping rotation with the locking mechanism. Assuming that the flange is rotating when the roller engages the notch, the roller reaches the bottom of the notch and effectively starts up a steep ramp beyond the bottom of the notch. This acts against the pneumatic actuator 39 which performs like a spring because of the compressibility of the air. The actuator and roller thus exert a force tending to stop rotation of the flange. The force rapidly increases beyond the center of the notch but is not an instantaneous increase as would be the case if the roller and notch had the same radius. It is desirable to have a small difference in radius to assure accurate centering of the roller in the notch and reproducible location of the axis of the run relative to the X-Y plane.

The edges where the notch meets the circumference of the flange are rounded, for example, with a radius about half the radius of the roller. The notch is deep enough that the tangent to the surface of the notch is at an angle of 45° or more from the radius of the flange at the center of the notch. This permits a relatively shallow notch that develops a maximum tangential force between the roller and notch that is about the same as the radially directed force applied to roller. Such "softening" of the notches provides a safety factor in the event the rollers engage the flange as it rotates under power. The rollers can be cammed out of the notches against the force of the pneumatic actuators without damage. Such notches are still stiff enough to provide firm latching of the flange in the home position when no driving power is applied to the yoke.

When the clutch 32 is disengaged and the locking mechanisms prevent rotation of the yoke around the B axis, rotation of the input shaft 27 to the gear box 21 causes rotation of the output shaft 47 from the gear box. A chain drive sprocket 48 is secured to the output shaft 47 and drives a roller chain 49 shown in phantom in FIGS. 1 and 2. The chain passes over an idler sprocket 51 for minimizing backlash and drives a sprocket 52 connected to the drive chuck 18 which engages one end of the mandrel 16. Thus, rotation of the output shaft 47 from the gear box 21 causes the mandrel 16 to rotate around the A axis.

In summary, by selective use of the clutch and locking mechanisms, the single drive motor 36 can cause rotation of the mandrel around either the A axis or the B axis. For rotation around the A axis, the clutch is disengaged and the locking mechanisms are engaged so that rotation of the yoke is prevented. Rotation of the drive motor 36 is coupled to rotation of the mandrel around the A axis by way of the aligned shafts 34, 28 and 27, the gear box 21, the output shaft 47, and the drive chain 49. Alternatively, when the clutch is engaged and the locking mechanisms disengaged, the mandrel can rotate around the B axis. Engagement of the clutch rotates the tube 22, gear box 21 and yoke 17. Since there is no relative rotation between the tube and the input shaft 27 to the gear box, there is no rotation of the output shaft 47 and hence no rotation of the mandrel around the run axis.

Rovings for winding a pipe fitting are fed to the mandrel by way of the delivery ring 13 which is mounted in a horizontal plane approximately tangent to the lower edge of the run of the fitting, as can be seen in FIG. 1. The rovings indicated by phantom lines 53 in FIG. 1 are dispensed from spools on a stand or creel (not shown) located behind the apparatus. Rovings pass through guide eyelets 54 in the apparatus below the level of the drive train for the A and B axis rotations. The rovings then pass through a comb 56 which maintains selected spacing between the rovings and removes clumps of tangled fibers and the like. A shield plate 57 keeps resin from splashing onto the comb 56.

A shallow resin pan 58 is positioned beneath the mandrel and delivery ring. The resin pan 58 has two sloping bottom walls so that liquid resin tends to flow toward the low part of the pan. This minimizes the quantity of resin needed in the pan. During winding, resin is withdrawn on the rovings and resin is intermittently added to the pan so that the average residence time of the resin in the pan is less than the "pot life" of the resin, i.e., the time when gelation commences after the resin is mixed.

Three parallel guide bars 59 extend horizontally across the apparatus near one bottom wall of the resin pan 58. Rovings from the comb 56 pass beneath the lowermost of the guide bars 59 near the bottom apex of the resin pan to assure that the rovings are immersed in resin en route to the delivery ring. The rovings then make a turn of about 90° around one of the other guide bars near the sloping bottom wall of the resin pan. As illustrated in FIG. 1 the rovings are turning around the highest of the three guide bars 59, which is used when relatively larger size pipe fittings are wound. With smaller size pipe fittings, the rovings are turned around the intermediate guide bar 59 en route to the delivery ring.

As the mandrel 16 rotates, rovings are wound on it and thereby drawn through the delivery ring and resin pan. The movement of the rovings around the guide bars immersed in the liquid resin thoroughly coats the fibers in the rovings with resin. Some excess resin is carried to the fitting being wound to assure that all of the fibers wound on the fitting are coated with resin and securely bonded. Excess resin flows from the fitting back to the resin pan. Various splash shields are provided on the apparatus around the region of the mandrel and portions of these shields have been deleted from the drawings for clarity of illustration.

The delivery ring is mounted on a pedestal 61 atop a generally U-shaped arm 62 which has a sufficient length to provide clearance as the arm moves the delivery ring in the X-Y plane. The pedestal can be mounted on the arm with bolts that will fail in the event of a collision between the delivery ring and another part of the apparatus. This permits replacement of inexpensive bolts and prevents damage to more costly parts of the apparatus. The height of the pedestal 61 is selected so that the delivery ring is in a horizontal plane approximately tangent to the bottom or lower edge of the run of the particular size of fitting being wound. Thus, a shorter pedestal is used when larger diameter fittings are wound. Some variations from tangency of the plane of the delivery ring to the lower edge of the fitting are acceptable. Thus, for example, the same height of pedestal can be used for winding both two and three inch pipe tees. With these sizes, the plane of the delivery ring can be more than one-half inch from tangency. With large size pipe fittings, such as twelve inch diameter, the plane can be more than an inch from tangency. With such tolerances, the ring is substantially tangent to the lower edge of the run of the fitting.

It is significant that the X-Y plane be approximately tangent to the lower edge, however. A tee can be wound with the plane of the delivery ring up to about the mid-plane of the fitting being wound. When the delivery ring is in a plane near the center of the fitting there is increased difficulty in avoiding collision between the branch on the mandrel and the delivery ring. As a result more "moves" can be required when winding rovings near the branch, such as in the crotches between the run and branch and in the diaphragm areas on each side of the tee near the intersection of the run and branch. As many as 10% of the moves used in winding a tee can be affected. It is estimated that the cost of winding some sizes of pipe tee can be increased by about 4% if the delivery ring is positioned at the centerline instead of in a plane approximately tangent to the lower edge.

The difficulty would be compounded if the delivery ring were above the centerline of the tee. The mandrel is rotated so that the lower portion of the mandrel always withdraws from the delivery ring. It is important to avoid reversing direction of rotation since this could cause the rovings to become slack and their location on the fitting could become indeterminate. Rotating the mandrel so that an upper portion withdraws from the delivery ring, i.e, so that the rovings are deposited on the upper portion of the mandrel is more difficult to implement. The rovings reach the delivery ring from below and in the illustrated embodiment the delivery ring can pass beneath the branch when the branch is above the X-Y plane. If the rovings were wound onto the upper portion of the mandrel, additional traverse in the Y direction would be needed for some moves so that the rovings between the resin pan and delivery ring did not collide with the branch.

Preferably, the plane in which the delivery ring moves is not significantly below the plane of tangency. As windings are made on the mandrel many patterns extend off an end of the run and reverse direction to bring the rovings back onto the run at a different location. When the delivery ring is significantly below the plane of tangency it is necessary to move the delivery ring a substantial distance beyond the end of the mandrel to assure that the rovings "hook" onto the post or drum at the end of the mandrel for reversing direction. This can result in excessive end trim which represents wasted material and difficulties can be encountered in preventing the rovings from becoming slack as they are wound on the mandrel. It is important to keep the rovings taut between the delivery ring and mandrel so that the point of intersection between the rovings and mandrel can be controlled.

Figure 3:
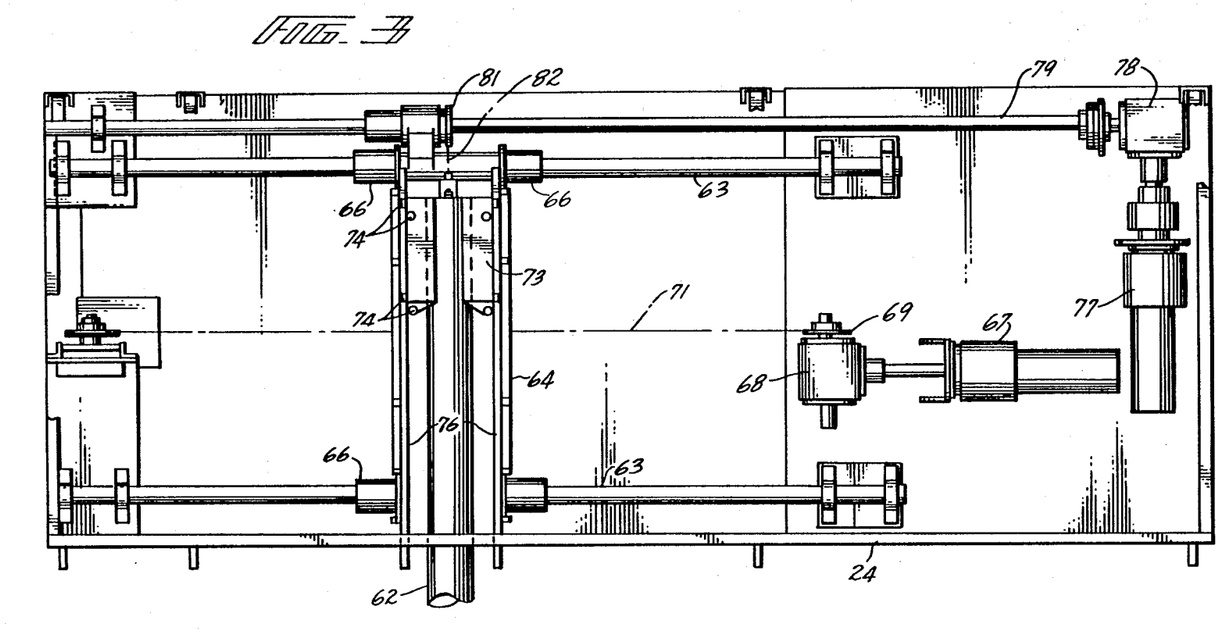
FIG. 3 is a top view of a portion of the apparatus for moving a delivery ring in X and Y directions.
Figure 4:
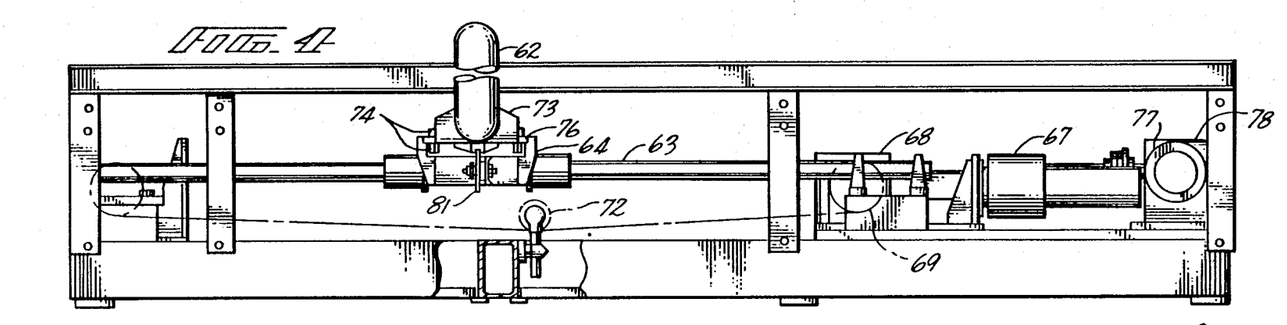
FIG. 4 is a side view of the portion of the apparatus illustrated in FIG. 3.

The arm 62 on which the delivery ring 13 is mounted is connected to an X-Y drive system illustrated in FIGS. 3 and 4. A pair of parallel support shafts or rails 63 are rigidly bolted to the main frame 24 of the apparatus. An X direction translation carriage 64 is mounted on the support shafts by guide sleeves 66. An X direction drive motor 67 is connected to an angle gear reducer 68 and the output shaft of the gear reducer has a chain drive sprocket 69. A roller chain 71 connected to the X carriage 64 passes over the drive sprocket 69. An idler sprocket 72 takes up slack in the drive chain to avoid backlash. When the X direction drive motor 67 rotates, the drive chain 71 moves the X carriage along the support shafts 63 thereby changing the X position of the delivery ring.

A Y direction translation carriage 73 is mounted on the X carriage 64. The Y carriage has rollers 74 engaging rails 76 extending along the length of the X carriage. The Y carriage can thus be guided along the length of the X carriage. A Y direction drive motor 77 is connected to an angle gear reducer 78. The output shaft of the gear reducer is connected to a splined shaft 79 which extends the full length of the travel of the X carriage 64. A Y direction drive sprocket 81 can move along the length of the splined shaft 79 and is driven in rotation by that shaft. A drive chain 82, most of which is hidden in the drawings, is connected to the Y carriage for moving it along the rails 76 on the X carriage. Thus, as the Y drive motor 77 is rotated, the splined shaft 79 rotates and the Y axis carriage 73 on which the arm 62 is mounted moves in the Y direction for controlling the position of the delivery ring.

The X-direction drive train and the Y-direction drive train can be driven separately or simultaneously at differing rates. Thus, the delivery ring can be moved in any direction in the X-Y plane.

Figures 7, 8, 9, 10:
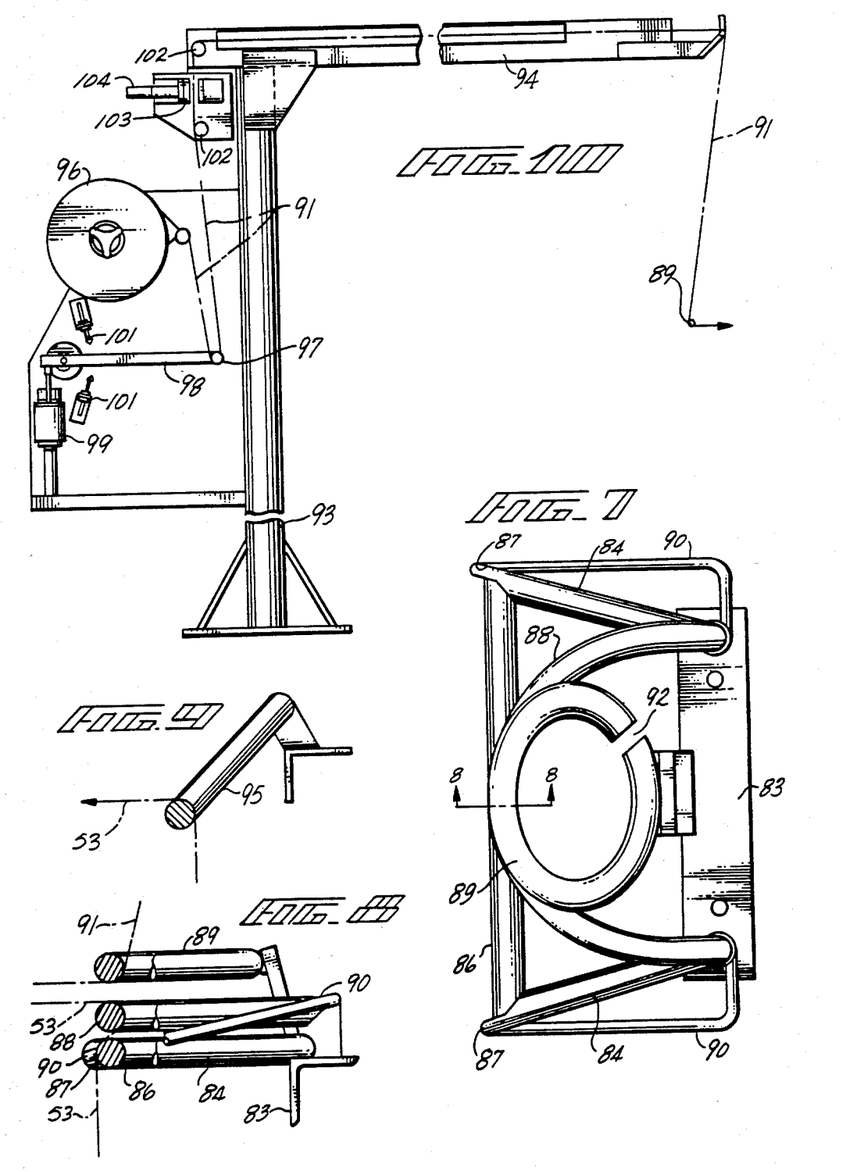
FIG. 7 is a top view of an exemplary delivery ring for delivering fiber roving in the apparatus.
FIG. 8 is a side view of the delivery ring.
FIG. 9 is a side cross-sectional view of another embodiment of roving delivery ring.
FIG. 10 is a side view of an accessory for delivering tape to the apparatus.

A representative delivery ring assembly 13 is illustrated in FIGS. 7 and 8. The delivery ring assembly has a number of parts welded together to form a unitary structure. Support for the delivery ring is provided by an angle 83 which bolts to the pedestal 61 (FIG. 1). Diagonal support bars 84 extend from the angle in a direction towards the mandrel. A straight horizontal guide bar 86 extends in the X direction between the ends of the support bars 84. Small knobs 87 at the ends of the guide bar help keep rovings from inadvertently pulling off an end of the guide bar.

A semi-circular roving feed bar or delivery ring 88 is located above the guide bar 86. This member over which the rovings travel can be referred to as a "ring", even though the back is open. It is, in effect, a ring, only the forward part of which engages rovings during use of the delivery assembly. In an exemplary embodiment, the guide bars and curved ring on the delivery assembly are made of one-half inch diameter steel rods.

A pair of downwardly sloping deflector bars 90 extend laterally from the rear portion of the curved bar 88 to a mid-portion of the knobs 87 on the ends of the diverging support bars 84. The deflector bars serve to guide rovings around the ends of the support bars during certain moves, thereby preventing inadvertent snagging of the rovings by the structure of the delivery assembly. Thus, for example, when winding on the branch, rovings can extend laterally from the delivery ring towards the branch and downwardly below the X-Y plane as the branch swings downwardly as the mandrel rotates around the A axis. Absent the deflector bars snagging might occur if a move were then made retracting the delivery ring away from the mandrel in the Y direction.

Rovings 53 come upwardly from the resin pan to the forward edge of the straight guide bar 86 and make a turn of about 90° around the guide bar to extend away from the mandrel. The rovings then make a turn of about 180° around the curved feed bar 88. The actual angle of turn in the illustrated embodiment is slightly less than 180° to provide clearance between the top of the guide bar and bottom of the curved feed bar to permit free passage of the rovings. The top of the curved feed bar 88 is apparoximately tangent to the lower edge of the fitting being wound as described above.

It is desirable that the rovings make a turn of about 180° around the curved feed bar 88. This minimizes changes in width of the band of rovings delivered toward the mandrel as the delivery ring is traversed in the X-Y plane to a position where rovings are fed from the feed bar toward the branch on the mandrel in a direction parallel to the A axis.

From about ten to thirty-six rovings of fibers can be wound on the mandrel simultaneously depending on the size of the rovings and the thickness of the layer desired. All of these pass through the delivery ring and are preferably delivered toward the mandrel as a flat band of substantially uniform width regardless of location of the delivery ring or direction of the rovings between the delivery ring and mandrel.

The individual rovings are spaced apart from each other substantial distances as they pass through the comb 56 (FIG. 1) before entering the resin bath. As an individual roving passes around a guide bar or the like, its stable position on that bar is a location where the angle at which the roving intersects the bar equals the angle at which the roving leaves the bar. This is true regardless of the angle of wrap around the bar.

The angle between individual rovings does not change when such rovings pass over a straight bar. Thus, for example, if rovings are converging (as they are between the comb 56 and feed ring 13 in the present apparatus), the angle of convergence is unaffected by wrapping around a straight guide bar regardless of the angle of wrap. Thus, the convergence of the rovings is unaffected by the guide bars 59 (FIG. 1) in the resin pan or the straight guide bar 86 on the delivery ring 13.

If a bar is curved instead of straight, the same rule applies, except that the angles of a roving intersecting or leaving the bar are measured relative to the tangent to the bar at the point of intersection. Thus, a curved bar can be used to change the angle of convergence of rovings. A curved bar or ring is commonly used to convert a converging fan of individual rovings to a parallel band of rovings of a desired width.

The width of the band that is formed depends on the length of the comb through which the rovings pass and the distance from the comb to the curved bar, that is, the angle of convergence; the curvature of the bar; and the angle of wrap of the band around the bar. Given a selected convergence angle, a narrower band is obtained by increasing the curvature of the bar; that is, as the radius of curvature is decreased, the band is narrowed. When rovings pass over a curved bar with an angle of wrap of 90° and leave the bar as a parallel band, they converge from the comb towards the bar with the effective center of convergence being the center of curvature of the bar. When the rovings make a 180° wrap around a curved bar, the effective center of convergence of the fan of rovings is one-half the distance between the bar and its center of curvature. Thus, for a bar with a given curvature, the width of the band produced by a 180° wrap is exactly one-half the width of a band produced by a 90° wrap. Conversely, for a desired band width, the radius of the curved bar can be twice as large when the rovings make a 180° wrap around the bar.

As the rovings are delivered from the curved feed bar to the mandrel the path of the parallel band may dip below the X-Y plane in some wrapping patterns. This can change the width of the band as the wrap angle changes. The rate of change of band width with respect to change in angle of wrap is not uniform, however, and it goes to zero when the wrap angle reaches 180° and the curvature of the bar is in a plane parallel to the planes of the fan and band. The rate of change is greater near a wrap angle of 90°. Under such circumstances, therefore, a delivery ring assembly as described and illustrated has a minimum change in band width when the wrap angle is momentarily increased by the band sloping downwardly toward the mandrel.

The 180° delivery ring assembly described and illustrated provides another important advantage. Specifically it delivers an orderly uniform band which is only slightly narrowed when the band vector is swung laterally as much as 90° from its central position, such as for example to deliver rovings toward the branch.

Since the delivery ring translates in an area in the X-Y plane on one side of the fitting being wound, rovings are delivered from the ring towards the mandrel in directions or "vectors" extending around an arc about 180° in front of the delivery ring. Thus, rovings may extend from the delivery ring forwardly towards the run or up to 90° laterally on either side towards the branch depending on the location of the delivery ring in the X-Y plane and the location on the mandrel being wrapped at that time.

When a curved bar has its curvature in the X-Y plane and the rovings make a 180° wrap around the bar, changes in width of the band of rovings with changes in band vector are minimized. The width of the band is maximum when the rovings are directed forwardly from the delivery ring, i.e., directly toward the run parallel to the B axis. As the direction swings to either side of this central position band width decreases with the width being proportional to the cosine of one-half the angle between the roving direction and the central position. Thus, when the band of rovings extends laterally at 90°, i.e., parallel to the A axis, the band width decreases to 70.7% of the maximum width. This is the minimum change in band width feasible from a curved bar delivery ring. Such change can readily be accommodated in the control program for the winding apparatus.

Such a curved bar in the X-Y plane with a wrap angle of about 180° is preferred for this reason and also since the locus where the band leaves the delivery ring remains in the X-Y plane, simplifying programming of machines moves.

An alternative delivery ring for rovings is illustrated in a side cross-sectional view in FIG. 9. In this embodiment the delivery ring comprises a curved bar 95 mounted at an angle of 45° from the X-Y plane. The convex side of the curved bar thus points downwardly in the direction of the mandrel. Rovings 53 approach the bar from below and leave approximately horizontally, making a wrap around the bar of about 90°. Such a delivery ring has greater narrowing of the band of rovings than the 180° delivery ring described and illustrated in FIGS. 7 and 8 but also has reduced drag on the rovings because of the smaller wrap angle. Such an embodiment of delivery ring can be useful when it is desired to minimize tension on the fiber rovings being wound on a mandrel.

Two principal effects narrow the effective width of the band as it swings laterally from the center position in such an embodiment. The same occurs as in the bar with a 180° wrap. Additionally, since the bar is tilted, its projection on a line parallel to the B axis decreases with increasing swing from the center position. Combined, these effects reduce the effective width of the band for winding circumferentially around the branch to 50% of the width in the central position. For a given radius of curved bar, the 90° wrapped band is twice as wide as the 180° band, hence the changes in band width are readily accommodated by programming the numerical control system to provide a desired thickness of rovings on the fitting.

As the band of rovings moves laterally on the curved bar tilted at 45° there is also a change in the vertical location where the band leaves the delivery ring. This can also be accounted for in programming the moves of the numerical control system.

The curvature of the curved bar over which the rovings are wrapped 180° is preferably parallel to the X-Y plane to minimize bunching of the rovings as windings are made on the branch. In another embodiment of delivery ring (not illustrated) the total angle of wrap can be reduced somewhat by lowering the horizontal straight guide bar 86 on the delivery ring further below the X-Y plane. This reduces the angle of wrap of the rovings around the curved bar below 180°. One can, for example, reduce the angle of wrap of rovings around the curved bar of the feed ring to about 150°. There is a concomitant reduction in the angle of wrap of the rovings around the straight guide bar for an appreciable reduction in the roving tension without unduly reducing the benefits of a delivery ring featuring a wrap of about 180°. The consequent decrease in band width and concomitant increase in "density" of fibers can be compensated for in programming the numerical control system to place fewer wraps in the affected areas.

Partial relief from the narrowing band width can also be provided by tilting the plane of curvature of the curved bar away from the X-Y plane or making the bar with a non-circular curvature. It can also be desirable to use non-uniform spacing between openings through the comb for adjusting the density of fibers across the width of the band. The preferred delivery ring has a semi-circular curved bar in the X-Y plane with a wrap around the bar of about 180°. Special compensating artifices can thereby be avoided.

It should be noted that the curved bar of the delivery ring acts similarly on all of the fiber rovings. Thus, the relative spacings between rovings is substantially unaffected by wrapping around the delivery ring. This is to be contrasted with a guide eyelet or the like which can bunch the rovings near an edge of the band without affecting rovings near the middle of the band.

The effective diameter of the curved bar 88 is about five inches when winding a four inch tee, for example. A smaller radius on the curved bar can be used for winding smaller pipe fittings and a smaller curvature (i.e., longer radius of curvature) can be used for winding larger pipe fittings. The width of the band of rovings (and also the number of rovings in the band) can thereby be made commensurate with the size of the fitting being wound.

It is desirable in many embodiments of pipe fitting to make at least some of the windings on the fitting with short fibers in what is referred to herein as a "tape". The tape is not the usual woven strip where both warp and weft are glass fibers. The preferred tape has several synthetic warp strands such as nylon serving as a carrier web for short parallel bundles of straight glass fibers as a weft. A typical tape suitable for winding a pipe tee has about a dozen warp strands of nylon spaced apart across the width of the tape for supporting the weft. The weft is formed of bundles of parallel glass fibers about six centimeters long. The bundles are made of short glass fibers ending at the edges of the tape as distinguished from a woven fabric in which the weft strands are continuous fiber repeatedly doubled back on themselves as selvage. The warp strands are knotted into a series of interlocking loops with each loop loosely holding a bundle of glass fibers. This leaves the bundles somewhat spaced apart along the length of the tape. The width of such a tape is not affected due to passage through a curved feed ring because of the stiffness of the transverse glass fibers.

An elliptical tape feed ring 89 is provided above the curved bar 88. A tape 91 is delivered from above the tape feed ring and takes a 90° wrap around the tape feed ring en route to the mandrel. The bottom of the tape feed ring 89 is spaced apart from the top of the curved bar 88 a sufficient distance to provide clearance for the tape and roving. Otherwise, the bottom of the tape feed ring is approximately in a plane tangent to the bottom of a pipe fitting being wound. A slot 92 is provided through a rear portion of the tape feed ring for ease of threading a tape in the apparatus.

Tape is fed to the tape feed ring 89 from a feed system illustrated in FIG. 10. The feed system is mounted on a vertical pedestal 93 and includes a horizontally extending boom 94, the outer end of which is approximately directly above the tape feed ring 89. A tape supply spool 96 is mounted on the pedestal by way of a variable friction brake (not shown). Tape 91 from the spool passes around a roller 97 on the end of a pivoted arm 98. The opposite end of the arm is connected to a pneumatic actuator and position sensor 99. Stops 101 prevent over-travel of the pivotable arm 98. The pneumatic actuator serves to maintain the arm substantially centered as shown. The arm is free to pivot between the stops to continually maintain tension in the tape 91. The position of the arm as it pivots against the biasing force of the pneumatic actuator provides a measure of tension in the tape. Control of the adjustable friction brake for the tape spool 96 is determined by the arm position for maintaining substantially constant tension on the tape.

After passing around the roller 97 on the end of the arm 98, the tape passes over guide rollers 102 on either side of a stop pad 103. The stop pad is mounted on the plunger of a pneumatic actuator 104. The tape then passes along the length of the boom and down to the tape feed ring 89.

In a representative embodiment a pipe fitting is wound with a layer of rovings, followed by a layer of both rovings and tape, followed by a layer of rovings. When winding such a fitting, a layer of rovings is applied to a mandrel and winding is interrupted. The end of a tape is then fed through the tape feed ring and connected to the fitting being wound. As the mandrel is rotated, tape is pulled through the feed ring, over the rollers and from the spool 96. When a sufficient quantity of tape has been wound on the fitting, the pneumatic actuator 104 connected to the stop pad is actuated. This clamps the tape which promptly breaks between the tape feed ring and the mandrel which is the point of greatest tension. Winding of a layer of rovings can then continue without interruption.

Tape can be delivered to the mandrel from a feed system as illustrated in FIG. 10 without passing through a bath of liquid resin. The tape is therefore dry as it is wound on the pipe fitting. As pointed out hereinabove, the band of rovings carries excess liquid resin from the resin pan to the mandrel. Each layer of tape is sandwiched between layers of rovings having excess resin and there is appreciable winding pressure as the fitting is rotated. This squeezes liquid resin through the fibers of the tape thereby assuring that all of the fibers in the pipe fitting are thoroughly wetted and secured by resin. Excess resin flows from the fitting back to the resin pan as the fitting is wound. If desired, excess resin can be wiped from the fitting after winding before removing the mandrel from the apparatus.

The entire assembly for dispensing rovings and tape and delivering the rovings and tape to the delivery ring remains stationary in the described apparatus. This is far preferable to movement of the roving supply system with the delivery ring since movement of the roving supply system can significantly limit the speed of winding a tee. It is desirable that the delivery ring accelerate from stationary to top speed in a fraction of a second, which results in acceleration rates well in excess of the acceleration of gravity. If it were necessary to move substantial portions of the roving delivery system, the rates of acceleration would need to be reduced to minimize forces applied to the delivery system. This would inherently limit the speed of winding a pipe fitting. This could also virtually preclude coating fibers with resin by running the fibers through an open bath of liquid resin.

Movement of and rotation of the roving delivery system can be avoided because of the passive guidance and band width determination by the curved bar of the delivery ring and its ability to deliver rovings toward the mandrel directly toward the run in a central position or laterally throughout an arc of at least 90° on either side of the central position for delivering rovings to the branch. To switch rotation from the A axis to the B axis, the delivery ring is translated so that the rovings intersect the mandrel adjacent the branch. A axis rotation is stopped and when B axis rotation is started, the windings pass through one of the crotches and continue on the branch without twisting the band of rovings. The reverse occurs when switching back to A axis rotation.

Although but one embodiment of apparatus for winding fiber-reinforced pipe fittings has been described and illustrated herein, many modifications and variations will be apparent to those skilled in the art. Many of these are changes in details of the apparatus without change of the basic method of winding a pipe fitting. For example, instead of driving X and Y carriages with chain drives, one or more lead screw drives could be substituted.

In the illustrated embodiment, alternate rotation of the mandrel around the A axis or the B axis is implemented by a mechanical arrangement including the locking mechanism having rollers 44 engaging the notches 46 in the periphery of the flange 26. A similar operation of the X axis and Y axis and either the A axis or the B axis can be provided by electrical rather than mechanical means. Such an arrangement is illustrated schematically in the block diagram in FIG. 11. Most of the control system illustrated is similar to the numerical control employed in the embodiment illustrated hereinabove.

Figure 11:
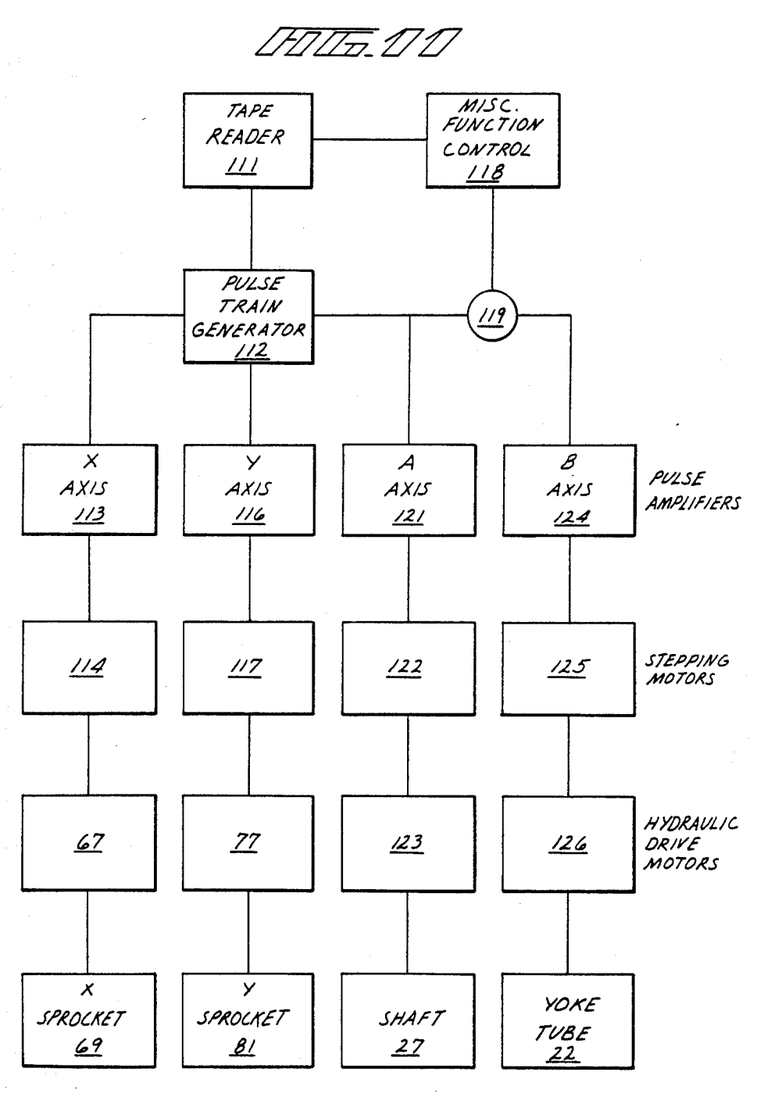
FIG. 11 is a block diagram of an electronic implementation of operation of the apparatus.

A tape reader 111 in the numerical control system reads the position and speed instructions in the program for winding a tee from a magnetic or punched tape. The signal from the tape reader is processed in a conventional pulse train generator 112 which produces three trains or sequences of electrical pulses for a three-axis control system. One series of pulses, for example, is applied to an X-axis pulse amplifier 113. The pulse amplifier amplifies the minute signals from the pulse train generator to a sufficient power level for operating a conventional stepping motor 114. The stepping motor is coupled to the X-axis hydraulic drive motor 67 (also illustrated in FIG. 3) which drives the X-axis drive sprocket 69. Each pulse from the pulse train generator drives the stepping motor through a certain angle (for example, 1.8°) which is directly followed by the hydraulic motor in a closed-loop servo system, and such motion is converted to a selected linear distance by the gearing provided in the X-drive subsystem.

Hydraulic drive motors for each axis are desirable since a high-output torque can be provided with low rotor inertia. Faster acceleration and deceleration can be obtained as compared with an electric motor of similar torque.

Similarly, the train of pulses from the pulse train generator for controlling Y-axis translation is applied to a Y-axis pulse amplifier 116 which drives a stepping motor 117. The Y-axis hydraulic drive motor 77 is slaved to the stepping motor and drives the Y-axis sprocket 81.

In the apparatus hereinabove described, the third train of signals from the pulse train generator is used for controlling the hydraulic drive motor 36 which is used for rotating the mandrel. Whether the A axis or B axis is rotated is determined by the clutch 32 and locking mechanisms. These are controlled by what is commonly known as a "miscellaneous function control" or "m-function" connected to the tape reader.

The pulses controlling the Y axis and A or B axes are synchronized with pulses controlling the X axis, so that control of all three axes is synchronized.

In the electronic-control embodiment illustrated in FIG. 11, a miscellaneous function control system 118 which receives m-function signals from the tape reader controls an electronic switch 119 which is in a circuit receiving the third train of pulses from the pulse train generator. These pulses are amplified by an A-axis pulse amplifier 121. This controls rotation of the shaft 27 (FIG. 1) by way of a stepping motor 122 and hydraulic drive motor 123. Rotation of the A-axis drive shaft is continually controlled by the train of pulses from the pulse train generator, just as in the "mechanical" embodiment described above. So long as the switch 119 is open, A-axis rotation can occur and there is no B-axis rotation.

When it is desired to rotate the mandrel around the B axis, the switch 119 is closed. The third train of pulses from the pulse train generator is thereby applied to both the A-axis pulse amplifier 121 and a B-axis pulse amplifier 124. The output of the B-axis pulse amplifier is applied to a stepping motor 125 and a hydraulic drive motor 126 which is coupled to the yoke tube 22 (FIG. 1). Thus, the same train of pulses controls two hydraulic drive motors, and the shaft 27 and tube 22 rotate in synchronism. Since the two are rotating together, there is B-axis rotation and no A-axis rotation, just as in the embodiment where the shaft and tube rotate together when interlocked by the clutch 32. Other electronic arrangements for controlling the X axis and Y axis and either the A axis or B axis can be provided by one skilled in the art.

In the apparatus described and illustrated herein, the delivery ring is translated in the X-Y plane with the ability to assume any position within a given area in that plane. Any location of the delivery ring in the X-Y plane can be defined by X and Y coordinates. If desired, each such location can be defined in polar coordinates. The numerical control system can be used to control such polar coordinates.

For example, the rovings extend in a straight line from the delivery ring to their intersection with the mandrel. This amounts to a vector from the mandrel to the delivery ring. Such vectors can be extrapolated to a circular arc bounding the area of the X-Y plane traversed by the delivery ring. A pipe fitting can therefore be wound by a delivery ring translated in the X-Y plane along such a circular arc.

Such an embodiment is implemented by mounting the support arm for the delivery ring on a vertical pivot axis so that the arm and ring can swing in a circular arc in the X-Y plane. The "moves" of the delivery ring are defined in terms of changing angle of such a pivot arm rather than the rate of traverse in the X and Y directions.

It will be recognized that as a delivery ring mounted on a pivot arm swings along a circular arc, the delivery ring is translated in both X and Y directions in the X-Y plane.

Such an embodiment is usable with a two-axis numerical control system instead of the three-axis numerical control system used in the embodiment hereinabove described and illustrated. Care must be employed in defining moves in an apparatus employing a pivot arm to support the delivery ring to assure that rovings do not go slack at any time. Moves where both X and Y are controlled are subject to the same consideration, however, in the preferred embodiment, the ability to move the delivery ring towards and away from the mandrel is of assistance in maintaining a desired tension in the rovings.

A numerical control system having a plurality of discrete moves wherein the motion stops between each move is desirable for ease in programming the winding of a fitting. Other types of numerical control systems are available such as one that slues from one motion to the next motion without coming to a stop. Such a numerical control system can be employed for winding a pipe tee or the like so long as care is exercised in programming. Caution must be exercised because of the varying position of the intersection of the rovings and mandrel for a given position of the mandrel and delivery ring. Such differing points of intersection are a function of the moves previously made. Thus, when sluing from one motion to the next, care must be taken to avoid the consequences of a phase lag between the rovings and the moves being made.

The numerical control system can be programmed to wind a tee or other fitting by determining the moves to be made analytically and experimentally and then translating these moves into system commands. Alternatively, a tee can be wound manually in such apparatus with the system set to remember the moves made. Once stored in the memory, such moves can be repeated at higher speed.

In the embodiment hereinabove described and illustrated, the mandrel for a pipe tee is arranged so that the axis of the branch is coincident with the B axis of the winding apparatus when the mandrel is in its home position. This is the optimum position since it has maximum symmetry and the programming of the numerical control system is simplified. A tee can be wound with the axis of the branch displaced from the B axis of rotation when a different set of machine moves is used for winding on each end of the tee.

Asymmetries are inherently present when winding a pipe lateral or Y where the branch diverges from the run at 45°. When winding such a fitting, the mandrel is rotated around a B axis that does not pass through the intersection of the run and branch axes, instead the B axis intersects the branch axis at a location away from the run axis. Such a location may, for example, be near the root of the crotch between the run and branch.

Alternatively, when winding a lateral, the mandrel can be mounted so that the axis of the side arm is coaxial with the B axis. The axis of the run is then at an angle of 45° relative to the X and Y axes when the mandrel is in its home position.

In the embodiment hereinabove described and illustrated, the A axis is parallel to the X-Y plane. If desired, the A axis can be tilted somewhat with respect to the X-Y plane. The mandrel can be rotated around the run axis coincident with the tilted A axis.

The effect of variations such as these can be characterized as introducing complications without concomitant benefits. Deliberately introduced asymmetries or unusual angles or locations can be compensated for by changes in the programming of the numerical control system which determines the location of the delivery ring in the X-Y plane in coordination with rotation of the mandrel around the A or B axes.

An arrangement as hereinabove described and illustrated is preferable since it is simplest to implement in a numerically controlled machine. Equivalent implementations to compensate for differences in position of various parts of the apparatus can readily be devised. Such implementations would ordinarily increase the number of moves required by the numerically controlled apparatus to complete winding of a fitting. As pointed out with respect to an embodiment where the delivery ring is traversed in a plane above the plane of tangency the increase in number of moves can increase the cost of a part being wound.

Although described in an embodiment for winding pipe fittings such as a tee, it will be apparent that other types of fiber reinforced structures such as pressure vessels, valves, pipe reducers, elbows, flanges, and the like can be wound as described herein. Many other modifications and variations will be apparent to those skilled in the art and it is therefore to be understood that within the scope of the appended claims, the invention may be practiced otherwise than as specifically described.

What is claimed is:

1. Apparatus for winding a fiber reinforced article comprising:
   means for holding and rotating a mandrel for the article;
   a delivery ring for delivering at least one fiber roving to the mandrel in response to mandrel rotation:
   means for translating the delivery ring in any direction in an X-Y plane while remaining fixed in a Z direction normal to the X-Y plane; and
   means for alternately rotating the mandrel around an A axis parallel to the X direction and a B axis parallel to the Y direction.

2. An apparatus as recited in claim 1 wherein the means for holding and rotating the mandrel comprises:
   a generally Y-shaped yoke;
   means on the arms of the yoke for engaging the ends of a run on a mandrel;
   drive means on an arm of the yoke for rotating the mandrel around the run axis; and
   means for rotating the yoke around the B axis.

3. Apparatus as recited in claim 2 further comprising means for selectively preventing rotation of the yoke when the axis of the run of the mandrel is coincident with the A axis.

4. Apparatus as recited in claim 3 wherein the means for preventing rotation of the yoke comprises:
   a circular flange connected to the yoke and coaxial with the B axis;
   a circular notch in the periphery of the flange;
   a cylindrical roller mateable with such a notch; and
   means for selectively advancing or retracting the roller relative to the flange.

5. Apparatus as recited in claim 4 wherein the effective diameter of the circular notch is greater than the diameter of the roller, and wherein the means for selectively advancing comprises yieldable means for biasing the roller towards the notch.

6. Apparatus as recited in claim 1 wherein the means for holding and rotating a mandrel comprises:
   a generally Y-shaped yoke rotatable around the B axis;
   means on the arms of the yoke for engaging a mandrel;
   means on the yoke for rotating the mandrel around the A axis; and
   means for locking the yoke against rotation around the B axis.

7. Apparatus as recited in claim 1 wherein the means for holding and rotating a mandrel comprises:
   a generally Y-shaped yoke rotatable around the B axis;
   means on the arms of the yoke for engaging the ends of the run on a mandrel;
   a gear box on the yoke with input and output shafts;
   a drive motor connected to the input shaft;
   means connected to the output shaft for rotating the mandrel around the run axis; and
   a clutch for selectively engaging the input shaft and the gear box for simultaneous rotation of the input shaft and gear box, or disengaging for rotation of the input shaft relative to the gear box.

8. Apparatus as recited in claim 1 wherein the means for holding and rotating a mandrel comprises:
   a generally Y-shaped yoke rotatable around the B axis;
   chuck means on the arms of the yoke for engaging a mandrel;
   a gear box on the yoke with input and output shafts;
   means connecting the output shaft and the chuck means for rotating the mandrel around the A axis; and
   means for selectively rotating the input shaft relative to the gear box and for rotating both the input shaft and the gear box without relative rotation therebetween.

9. Apparatus as recited in claim 1 wherein the delivery ring comprises a curved bar and a straight bar rigidly connected to the curved bar so that such a roving passes through a partial wrap around the straight bar and a partial wrap around the concave side of the curved bar before winding on the mandrel.

10. Apparatus as recited in claim 9 wherein such roving wraps around the curved bar about 180°.

11. Apparatus as recited in claim 9 wherein the curved bar is in the X-Y plane and its curvature is in the X-Y plane.

12. Apparatus as recited in claim 1 wherein the delivery ring comprises a straight bar for receiving roving from below the straight bar and delivering roving in a generally horizontal direction, and a curved bar rigidly connected to the straight bar for receiving roving on its lower side from the straight bar and delivering roving generally horizontally from its upper side toward the mandrel.

13. Apparatus as recited in claim 12 wherein the curvature of the curved bar is in the X-Y plane.

14. Apparatus as recited in claim 1 wherein the delivery ring comprises a curved bar having a circular arc parallel to the X-Y plane and means for delivering roving to the curved bar for wrapping around the curved bar about 180° enroute to the mandrel.

15. Apparatus as recited in claim 14 wherein the means for delivering roving to the curved bar comprises a straight bar parallel to the X-Y plane and fixed to the curved bar.

16. Apparatus as recited in claim 1 wherein the delivery ring is in the X-Y plane and the X-Y plane is approximately tangent to an edge of the article.

17. Apparatus as recited in claim 1 wherein the delivery ring comprises a curved bar having its curvature in a plane at 45° to the X-Y plane and such roving wraps around the curved bar about 90°.

18. Apparatus as described in claim 1 further comprising:
   a resin pan for liquid resin; and
   means for conveying a converging fan of fiber rovings through the resin pan for coating with liquid resin and toward the delivery ring; and wherein the delivery ring comprises a curved bar for receiving the converging fan of rovings and delivering an approximately parallel band of rovings toward the mandrel.

19. Apparatus as recited in claim 1 wherein the means for translating the delivery ring in an X-Y plane comprises:
   an X carriage;
   means for guiding translation of the X carriage in the X direction;
   means for reversibly driving the X carriage in the X direction independent of the Y direction;
   a Y carriage;
   means for guiding translation of the Y carriage in the Y direction;
   means for reversibly driving the Y carriage in the Y direction independent of the X direction; and
   means for coupling the delivery ring to the X and Y carriages.

20. Apparatus as recited in claim 19 wherein the Y carriage is mounted on the X carriage.

21. Apparatus as recited in claim 20 wherein the delivery ring is rigidly mounted on the Y carriage.

22. Apparatus as recited in claim 1 wherein the means for translating the delivery ring in an X-Y plane comprises:
   an arm for supporting the ring in the X-Y plane;
   a Y carriage supporting the arm;
   means for mounting the Y carriage on an X carriage for translation along the length of the X carriage;
   means for driving the Y carriage along the length of the X carriage independently of position or motion of the X carriage; and
   means for driving the X carriage in the X direction independently of position or motion of the Y carriage relative to the X carriage.

23. Apparatus as recited in claim 22 wherein the means for driving the X carriage comprises a reversible X drive motor, an X drive sprocket connected to the X drive motor, and a chain connected to the X carriage and engaging the X drive sprocket.

24. Apparatus as recited in claim 23 wherein the means for driving the Y carriage comprises a Y drive motor, a splined shaft connected to the Y drive motor, a Y drive sprocket connected to the splined shaft for translation along the length of the splined shaft in response to translation of the X carriage; and a chain connected to the Y carriage and engaging the Y drive sprocket.

25. Apparatus for winding a fiber reinforced pipe fitting comprising:
   means for holding a mandrel for the fitting;
   a delivery ring for delivering at least one fiber roving to the mandrel in response to mandrel rotation;
   means for translating the delivery ring synchronously in orthogonal X and Y directions in an X-Y plane while maintaining the delivery ring motionless in a Z direction normal to the X-Y plane;
   means for rotating the mandrel around an A axis parallel to the X direction and for rotating the mandrel around a B axis parallel to the Y direction; and
   means for preventing rotation of the mandrel around the B axis while rotating around the A axis and for preventing rotation of the mandrel around the A axis while rotating around the B axis.

26. Apparatus for winding a fiber reinforced pipe fitting having a straight run and a lateral branch comprising:
   a generally Y-shaped yoke;
   means on the yoke for holding a pipe fitting mandrel and rotating the mandrel around the axis of the run;
   means for rotating the yoke around a B axis normal to the run axis;
   a delivery ring for delivering fiber rovings to the mandrel; and
   means for translating the delivery ring synchronously in orthogonal X and Y directions in an X-Y plane parallel to the B axis and offset from the B axis a distance approximately the same as the radius of the run of such a mandrel.

27. Apparatus as recited in claim 26 further comprising:
   clutch and lock means for alternately permitting rotation of the yoke around the B axis while preventing rotation of the mandrel around the run axis or permitting rotation of the mandrel around the run axis while preventing rotation of the yoke around the B axis.

28. Apparatus for winding a fiber reinforced pipe tee having a straight run and a lateral branch comprising:
   means for holding a pipe tee mandrel with the axes of the run and branch intersecting at a point P;
   means for rotating the mandrel around an A axis coincident with the axis of the run and for alternately rotating the mandrel around a B axis through the point P and normal to the A axis;
   a delivery ring for delivering fiber rovings to the mandrel in response to mandrel rotation;
   means for translating the delivery ring in any direction in an X-Y plane parallel to the A and B axes; and
   means for delivering a converging fan of rovings to the delivery ring; and wherein
   the delivery ring comprises a curved bar for receiving the converging fan of rovings on one said and delivering a generally parallel band of rovings toward the mandrel from another side, the curved bar having a sufficient arc length for delivering a generally parallel band of fibers in a central direction toward the run normal to the A axis, and also laterally throughout an arc of at least 90° on either side of the central direction.

29. Apparatus for winding a fiber reinforced pipe tee having a straight run and a lateral branch comprising:
   means for holding a pipe tee mandrel with the axes of the run and branch intersecting at a point P;
   means for rotating the mandrel around an A axis coincident with the axis of the run and for alternately rotating the mandrel around a B axis through the point P and normal to the A axis;

a delivery ring for delivering fiber rovings to the mandrel in response to mandrel rotation;

means for translating the delivery ring in any direction in an X-Y plane parallel to the A and B axes; and means for delivering a converging fan of rovings to the delivery ring; and wherein the delivery ring comprises a curved bar for receiving the converging fan of rovings on one side and delivering a generally parallel band of rovings toward the mandrel from another side, the curved bar being confined within the X-Y plane for delivering such a generally parallel band of rovings toward any portion of the mandrel.

30. Apparatus for winding a fiber reinforced pipe fitting comprising:

means for holding a mandrel for a pipe fitting;

a delivery ring for delivering at least one fiber roving to the mandrel in response to mandrel rotation;

means for translating the delivery ring in any direction in an X-Y plane substantially without translation in a Z direction normal to the X-Y plane;

means for rotating the mandrel around an A axis parallel to the X direction;

means for rotating the mandrel around a B axis parallel to the Y direction; and means for switching between either rotation of the mandrel around the A axis without rotation around the B axis or rotation of the mandrel around the B axis without rotation around the A axis.

31. Apparatus as recited in claim 30 wherein the X-Y plane is substantially tangent to such a mandrel.

32. Apparatus as recited in claim 30 wherein the area of translation of the delivery ring in the X-Y plane is displaced in the Y direction on one side of the A axis.

33. Apparatus for winding a fiber reinforced pipe tee having a straight run and a lateral branch comprising:

a frame;

means on the frame for holding and rotating a mandrel for a pipe tee comprising:

a generally Y-shaped yoke, means on the arms of the yoke for engaging the ends of the run on such a mandrel, a gear box on the yoke including an input shaft and an output shaft, a drive train connected to the output shaft for rotating the mandrel around the run axis an response to rotation of the output shaft, a reversible drive motor connected to the input shaft, a clutch for selectively engaging the gear box and yoke with the input shaft for simultaneous rotation of the shaft and yoke around a horizontal B axis normal to the axis of the run, and means for selectively locking the yoke against rotation around the B axis;

an X carriage mounted in the frame;

means for reversibly translating the X carriage in a horizontal plane in an X direction normal to the B axis;

a Y carriage mounted on the X carriage;

means for reversibly translating the Y carriage along the length of the X carriage in a Y direction parallel to the B axis independently of position or motion of the X carriage;

an arm rigidly mounted on the Y carriage;

a roving delivery ring rigidly mounted on the arm including a generally semi-circular bar in a horizontal X-Y plane approximately tangent to the lower edge of such a mandrel, the curved bar being concave away from such mandrel;

a straight horizontal bar on the delivery ring extending in the X direction and at least in part spaced below the curved bar and nearer such mandrel than the curved bar;

a resin pan on the frame beneath the delivery ring for containing a liquid resin; and means for guiding a converging fan of fiber rovings through a lower portion of the resin pan and upwardly to the straight bar on the delivery ring.

* * * * *